Feb. 27, 1923.
C. STADLER
VACUUM SEALING MACHINE
Filed Dec. 29, 1921  3 sheets-sheet 2
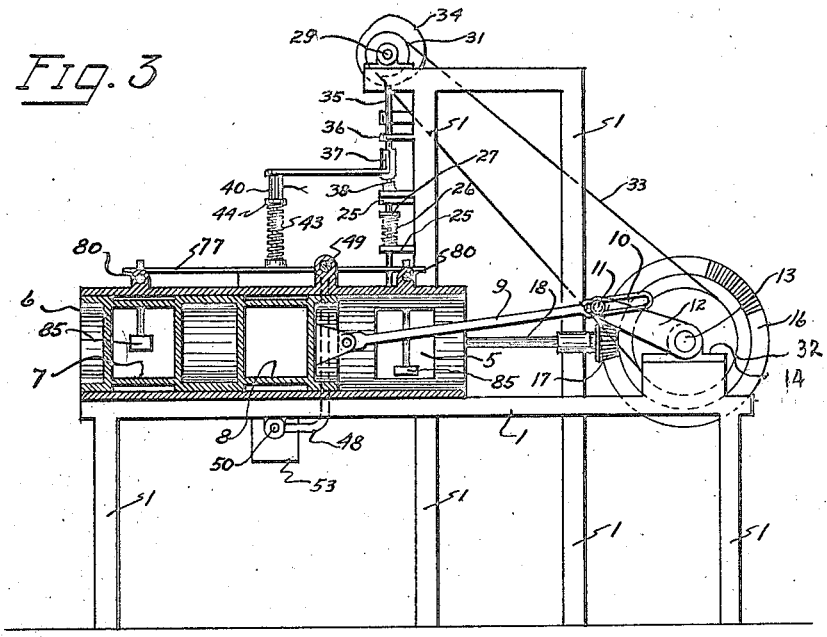
Fig.3
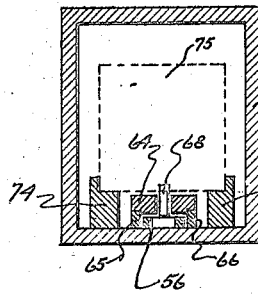
Fig.4
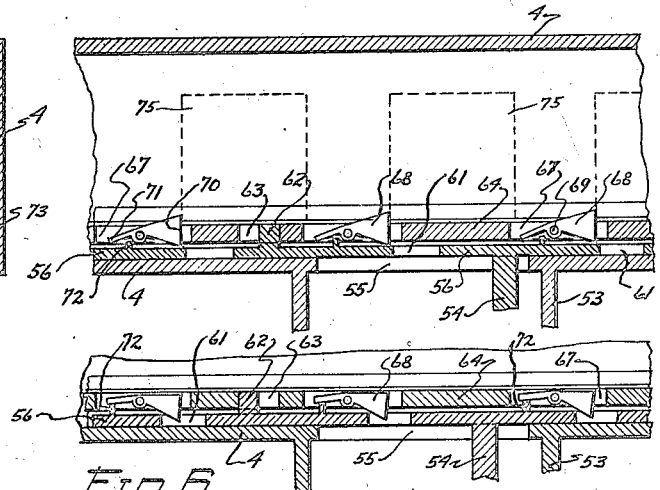
Fig.5
Fig.6
WITNESSES:
Josf. E. Kintner.
INVENTOR
C. Stadler
By H.J. Sanders
Atty.

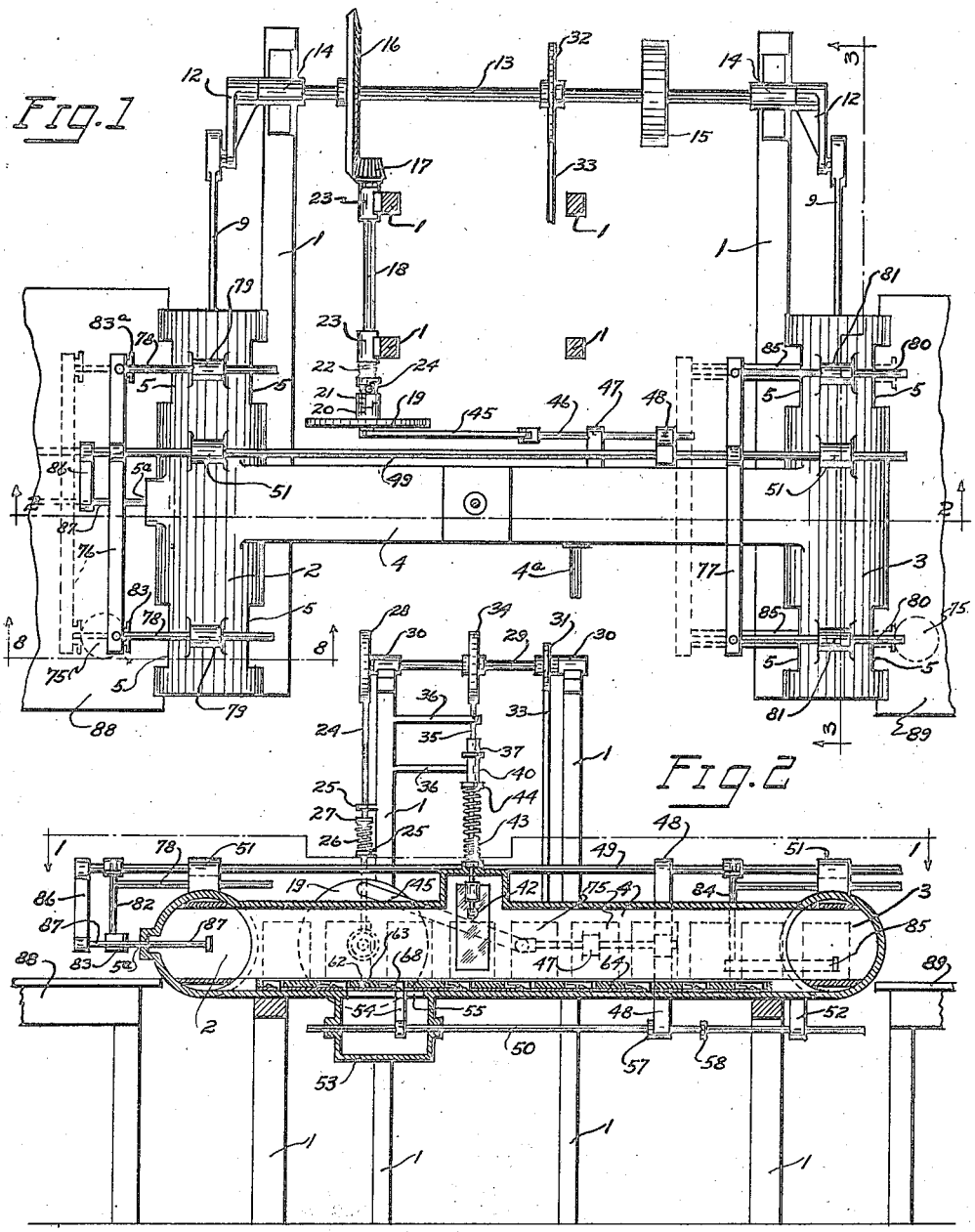

Feb. 27, 1923.
C. STADLER
1,446,594
VACUUM SEALING MACHINE
Filed Dec. 29, 1921
3 sheets-sheet 3
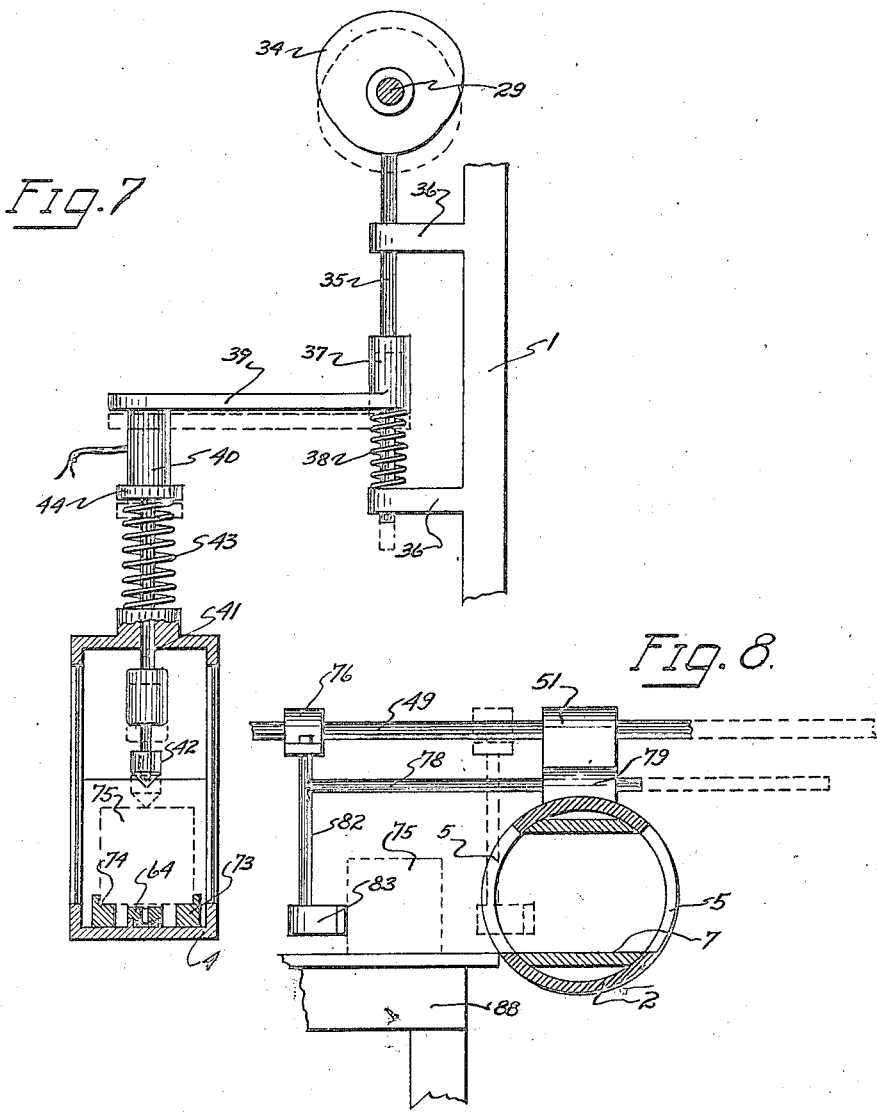
WITNESSES:
Jos E. Furtner
INVENTOR
C. Stadler
H. J. Sanders
By          Atty.

Patented Feb. 27, 1923.

1,446,594

UNITED STATES PATENT OFFICE.

CHARLES STADLER, OF CHICAGO, ILLINOIS.

VACUUM-SEALING MACHINE.

Application filed December 29, 1921. Serial No. 525,754.

*To all whom it may concern:*

Be it known that I, CHARLES STADLER, a citizen of the United States, residing at Chicago, in the county of Cook and State of Illinois, have invented certain new and useful Improvements in Vacuum-Sealing Machines, of which the following is a specification.

This invention relates to improvements in vacuum sealing machines and more particularly to machines of this type adapted primarily for sealing metal cans. One object is to provide a machine of this type that is continuous and automatic in operation. A further object is to provide a machine so operated as to allow ample time for the solder to set after it is employed in the sealing operation. Simplicity in construction, efficiency and durability are other objects attained.

More specifically my machine comprises a can-receiving chamber and a can-discharge chamber connected by a vacuum chamber, means being provided for feeding the cans into the receiving chamber, discharging them therefrom into the vacuum chamber, conveying them therethrough to and into the discharge chamber from which they are automatically ejected upon a receiving table, sealed. An intermittent motion characterizes the several chambers referred to, said motions being so timed relatively as to insure sequential operation upon the several cans received by the machine, the soldering operation taking place, of course, in the vacuum chamber.

With the foregoing and other objects in view the invention consists in the combination and arrangement of parts to be hereinafter fully described, pointed out in the appended claims and illustrated in the accompanying drawings which form a part of this application and in which—

Fig. 1 is a plan view of the machine taken on line 1—1 of Fig. 2.

Fig. 2 is a vertical sectional view taken on line 2—2 of Fig. 1.

Fig. 3 is a section taken on line 3—3 of Fig. 1.

Fig. 4 is a section taken through the vacuum chamber, enlarged.

Fig. 5 is a longitudinal sectional view through a portion of the vacuum chamber, enlarged.

Fig. 6 is a similar view with the movable parts in an altered position.

Fig. 7 is an enlarged fragmentary sectional view illustrating the soldering mechanism.

Fig. 8 is a section on line 8—8 of Fig. 1.

Like reference characters denote corresponding parts throughout the several views.

The reference numeral 1 denotes a framework or bed whereon my machine is arranged, said machine comprising the receiving chamber 2 and the discharge chamber 3, said chambers being in spaced aligned relation and connected by the vacuum chamber 4 which is connected by pipe $4^a$ to a vacuum pump. The chambers 2 and 3 are cylindrical, substantially, open at the ends and each is formed with two pairs of ports or openings 5, the members of each pair of ports being disposed adjacent the ends of each chamber. Each chamber registers at its longitudinal central portion with one end of the vacuum chamber 4, the chamber 2 being formed further with a small perforation $5^a$ in alignment with one end of the vacuum chamber. The pairs of openings in each chamber 2 or 3 are equidistant from the vacuum chamber.

Within each chamber is a piston 6 formed with spaced perforations 7, 8 which form receiving ports. Each piston is connected by a piston rod 9, having an elongated loop 10 in its forward end, to the pin 11 of the crank 12, the two cranks 12 being fast upon opposite ends of the drive shaft 13, rotating in bearings 14, driven by the pulley 15 connected to a power source.

As the drive shaft rotates the cranks 12, which are aligned with each other, impart an intermittent reciprocating movement to the pistons, the pause in the movement of the pistons coming as they are at one or the other extreme end of their cylinders and at this time one of their ports or openings is aligned with one pair of end perforations and with the central perforations in the cylindrical chambers 2, 3; the length of time during which the pistons pause at the end of each stroke being the time required for the drive shaft to make one-sixth part of one revolution.

Fast upon the drive shaft is a bevel gear 16 in mesh with a bevel pinion 17 of a transmission shaft 18 and loose upon said shaft is a wheel 19 provided with a clutch member 20 adapted for releasable engagement with a clutch member 21 keyed upon the shaft 18, said clutch members being yieldingly retained in engaged relation by the abutting spring 22 that encircles the shaft and abuts the shaft collar 23.

The clutch member 21 is formed with an irregular groove to receive the lower end of a pitman 24 arranged in guides 25, of the framework, said pitman being yieldingly retained out of engagement with the clutch member 21 by the encircling spring 26 and collar 27, the upper end of said pitman being intermittently depressed by the periphery of a cam 28 fast upon a transmission shaft 29, journaled in a bearing 30 of the framework 1, which shaft has also fast thereupon a pulley 31 connected to a pulley 32, of the drive shaft, by the belt 33, the pulley 31 being one-half the diameter of the pulley 32 so that the transmission shaft 29 makes two revolutions to each revolution of the drive shaft 13. Fast upon the shaft 29 is another cam 34 the periphery of which intermittently depresses a pitman 35, arranged in guides 36 of the framework, said pitman having fast thereupon a casting 37 separated from one of the guides 36 by an expansion spring 38 whereby said piston is yieldingly retained in a predetermined position with its upper end always in contact with the cam 34. The casting 37 is formed with an arm portion 39 that engages the electric solderer 40, the stem 41 of which extends into the vacuum chamber 4 and is provided with the tip 42, an expansion spring 43 encircling said stem abuts the vacuum chamber and an annular shoulder 44 formed upon the solderer to yieldingly retain the same in raised position relative to the vacuum chamber.

A connecting rod 45 is connected, off center, to the wheel 19, said rod being pivotally connected also to a slide rod 46 adapted to reciprocate in a bearing 47 affixed to the vacuum chamber, said rod 46 being connected by a link 48 to the slide rods 49, 50 which rods extend longitudinally of the vacuum chamber, the rod 49 being disposed above said chamber and sliding in bearings 51 arranged upon the chambers 2, 3 and the rod 50 being disposed beneath the vacuum chamber and sliding in a bearing 52, depending from said chamber, and through a depending boxing 53 carried by the casing. A link 54 is made fast to the slide rod 50 within the boxing 53 and extends up through an elongated perforation 55 in the vacuum chamber and terminates in an integral sliding plate 56 that reciprocates upon the base of the vacuum chamber as the wheel 19 rotates. The link 48 while made fast to the slide rod 49 slides loose upon the rod 50 and does not "pick up" or move said rod until it contacts with one or the other of the collars 57, 58 fast to said rod.

The plate 56 extends longitudinally of the base of the vacuum chamber and is formed with a plurality of spaced perforations 61 and with one integral upstanding finger 62 that extends into a small perforation 63 formed in another and wider sliding bar 64, the lateral edges of which are grooved and supported upon the spaced stationary rails 65, 66 between which the slide bar 56 extends; said slide bar 64 being formed with a plurality of elongated perforations 67 and in each of said perforations 67 is a trigger 68 fulcrumed upon a pin 69 that connects the sides of the perforated portions of the bar. Each trigger is formed with a wide end 70 and with a pointed end 71, the trigger being so fulcrumed upon its pin 69 that the wide end 70 has a tendency to move or gravitate downwardly or toward the base of the vacuum chamber. The slide bar 56 is formed with a plurality of upstanding lugs 72 disposed beneath the pointed ends of the several triggers and capable of insuring positive operation of the same in a manner to be hereinafter fully described. Spaced away from the rails 65, 66 are the recessed members 74, 73 of a runway that extends substantially from end to end of the vacuum chamber and that supports the cans 75 under operation in such manner that the base of each can clears the upper face of the slide bar 64.

Referring again to the slide rod 49 the same has fast thereupon the reach bars 76, 77, the former of which is provided with guide rods 78 that reciprocate in guide bearings 79 arranged upon the receiving chamber 2, and the latter is provided with guide rods 80 that reciprocate in similar guide bearings 81 arranged upon the discharge chamber 3, said guide rods 78 being formed with the branches 82 that carry the shoes 83, 83ª disposed in alignment with the ports 5 of the chamber 2; and the guide rods 80 being formed with the branches 84 being formed with shoes 85 disposed in alignment with the ports 5 of the chamber 3. The said slide rod 49 is provided at one end with the depending link 86 that carries the push rod 87 that extends into the small perforation 5ª formed in the longitudinal central portion of the receiving chamber.

In operation the cans 75 are placed upon the work table 88 and are then manually placed by an attendant, one at a time, alternately before the shoes 83 and 83ª so that the cans will be placed alternately in opposite ends of the receiving chamber, first in one and then in the other of the ports 7, 8 of the piston 6. It will be noted that as the shaft 13 rotates the piston 6 is stopped for a period of one-sixth of a shaft-revolution on each half turn of the cranks 12 and this movement is so arranged that at one stop of the piston its port 7 is aligned with one port 5, of the chamber 2, and the port 8 with the chamber perforation 5ª and one end of the vacuum chamber; at the next stop of the piston the port 8 is aligned with one port 5 and the piston port 7 with the perforation 5ª and with one end of the vacuum chamber. Each time the piston moves in the receiving chamber one can is delivered from one end of that chamber to the center of the same and one can is removed, by the push rod 87, into the vacuum chamber. Each complete stroke of the piston, therefore, delivers two cans to the vacuum chamber.

While the shaft 13 drives the shaft 18 continuously an intermittent movement is imparted to the wheel 19 and this movement is so timed by the cam 28, pitman 24 and clutch 20—21 that the said wheel moves during the period that the pistons in the chambers 2, 3 are at rest. When the cans are being fed to the machine regularly one can will be delivered upon the runway within the vacuum chamber, by the push rod 87, each time the slide bars 56, 64 are put in motion, and the cans thereby advanced. An intermittent reciprocating movement is imparted to the slide bars by the link 48 connected to the slide rod 49. The length of each stroke imparted will be determined by the distance between the collars 57, 58 adjustably arranged upon the slide bar 50. The greater the distance between the collars, the shorter the stroke. This movement is transmitted from the bar 50 through the link 54 that terminates in the plate 56. As this plate moves toward the receiving chamber 2 it moves the slide bar 64 by means of the finger 62. At this time the lugs 72 have ridden beneath the tip end 71 of the triggers dropping the wide ends thereof into the perforations 59, in the bar 56, now therebeneath as shown in Fig. 6. At the end of this stroke the triggers 68 are beneath the cans 75, which do not move by direct contact with the slide rods 56, 64 but rest upon the runway 73, 74. Upon the return stroke of the slide rods the rod 56 is first moved to such a point that the shoulders formed by the ends of the slots 61 will ride the wide ends of the triggers out of those slots, the lugs 72 meanwhile having been moved toward the trigger fulcrums, the finger 62 will move to the opposite end of the slot 63 and impel the rod 64 and triggers forward or toward the chamber 3, the triggers now extending above the rod 64 and engaging the cans and impelling them forward. Immediately that the stroke is completed in one direction the cam 34 will operate to depress the pitman 35 and cause the solderer to function. It will be noted at this point that the soldering tip will be retained in engagement with the solder, which is dropped cold upon the can perforation before it is placed in the machine, long enough for the solder to melt.

After a can passes from beneath the soldering iron it is moved intermittently to the end of the vacuum chamber and from the same into the discharge chamber upon one of the ports of the piston 6 and discharged therefrom by the shoe 85, the cans being alternately ejected from the ports at opposite ends of the chamber 3 upon the table 89.

What is claimed is:—

1. In a vacuum sealing machine, a receiving chamber, a discharge chamber, a vacuum chamber connecting the first named chambers, a piston within said receiving chamber, a second piston within said discharge chamber, means for feeding receptacles into said receiving chamber upon said piston, means for discharging said receptacles from said piston into said vacuum chamber, means for imparting an intermittent movement to said receptacles to transport them through said vacuum chamber to and upon said second piston, soldering mechanism associated with said vacuum chamber for operation upon said receptacles consecutively while they are at rest, and means for discharging said receptacles from said second piston.

2. In a vacuum sealing machine, a receiving chamber, a discharge chamber, a vacuum chamber connecting the first named chambers, means for continuously and automatically feeding receptacles to said receiving chamber, means for consecutively transferring said receptacles from said receiving chamber, in the order received, to said vacuum chamber, means for conveying said receptacles through said vacuum chamber and into said discharge chamber, soldering means within said vacuum chamber operative upon said receptacles during their period of transit through said chamber, and means for automatically and consecutively removing said receptacles from said discharge chamber.

3. In a vacuum sealing machine, a chamber having receiving ports at its ends, a second chamber having discharge ports at its ends, a vacuum chamber connecting the first named chambers, a piston within said first named chamber formed with ports adapted to align successively with the end ports of said chamber and with the said vacuum chamber, a second and similar piston within said second chamber operating synchronously with said first named piston, means associated with said first named chamber for automatically feeding receptacles alternately to the ports of said first named piston, means associated with said chamber for successively discharging said receptacles from the ports of said first named piston into said vacuum chamber, means for transmitting said receptacles therethrough and into the ports of said second piston, means for applying solder to said receptacles while in transit and means for alternately ejecting said receptacles from the ports of said second piston.

4. In a vacuum sealing machine, a chamber having receiving ports at its ends, a second chamber having discharge ports at its ends, a vacuum chamber registering with the aforesaid chambers between their terminal ports, pistons within said chambers and formed respectively with ports adapted to register alternately with the terminal ports of their chambers and with said vacuum chamber, driving mechanism for said pistons whereby they are actuated synchronously and intermittently, means for alternately feeding receptacles into the ports of one of said pistons, means for automatically and consecutively discharging said receptacles from said piston into said vacuum chamber, means for conveying said receptacles through said vacuum chamber and into the ports of the second piston, means for consecutively discharging said receptacles from said second piston ports through the ports of said second chamber, and soldering means for said receptacles operative thereupon while they are in transit through said vacuum chamber.

5. In a vacuum sealing machine, a receptacle receiving chamber having ports at each of its ends, a receptacle discharge chamber having ports at each of its ends, a vacuum chamber registering with the aforesaid chambers at points midway between their terminal ports, a conveyer within said vacuum chamber having an intermittent motion, a piston within said receiving chamber having ports adapted to register alternately with the terminal ports and with said vacuum chamber, a similar piston within said discharge chamber, means for automatically feeding receptacles alternately to the ports of said first piston through the terminal ports of said receiving chamber, means for successively and automatically discharging said receptacles upon said conveyer whereby they are carried to and discharged upon said second piston, means for soldering said receptacles in transit, and means for successively discharging said receptacles from said piston.

6. In a vacuum sealing machine, a receptacle receiving chamber having ports at each of its ends, a receptacle discharge chamber having ports at each of its ends, a vacuum chamber registering with the aforesaid chambers at points midway between their terminal ports, a runway extending longitudinally of said vacuum chamber, rails within said vacuum chamber, a perforate sliding rod arranged upon said rails, a second perforate sliding rod beneath the first named slide rod and between said rails, a drive shaft, transmission mechanism for adjustably transmitting an intermittent reciprocating movement from said drive shaft to said second slide rod, means connecting said slide rods for transmitting a predetermined movement from the second to the first slide rod, triggers carried by said first slide rod in the perforations thereof for partial disposition in the perforations of said second slide rod at predetermined periods, pistons within said receiving and discharge chambers, said pistons being formed with ports adapted to register alternately with the end ports of said chambers and with said vacuum chamber, connection between said pistons and said drive shaft whereby said pistons receive an intermittent motion synchronously, shoes for said feeding receptacles alternately to the ports of one of said pistons through the terminal ports of said receiving chamber, shoes for discharging the receptacles from the ports of said piston and from the ports of the piston in said discharge chamber simultaneously, the receptacles from the first named piston being disposed upon said runway for engagement consecutively with the said triggers, and soldering means for said receptacles between their periods of motion over said runway.

In testimony that I claim the foregoing as my own I have hereto affixed my signature in the presence of two subscribing witnesses.

CHARLES STADLER.

Witnesses:
FRANK KOSHOROSKI,
C. L. OSGOOD.